Dec. 8, 1959  G. PERSAK, JR  2,915,965
MACHINE FOR PRINTING AND VENDING INSURANCE FORMS
Filed Feb. 7, 1955  9 Sheets-Sheet 1

INVENTOR.
GEORGE PERSAK, JR.
BY
ATTORNEY

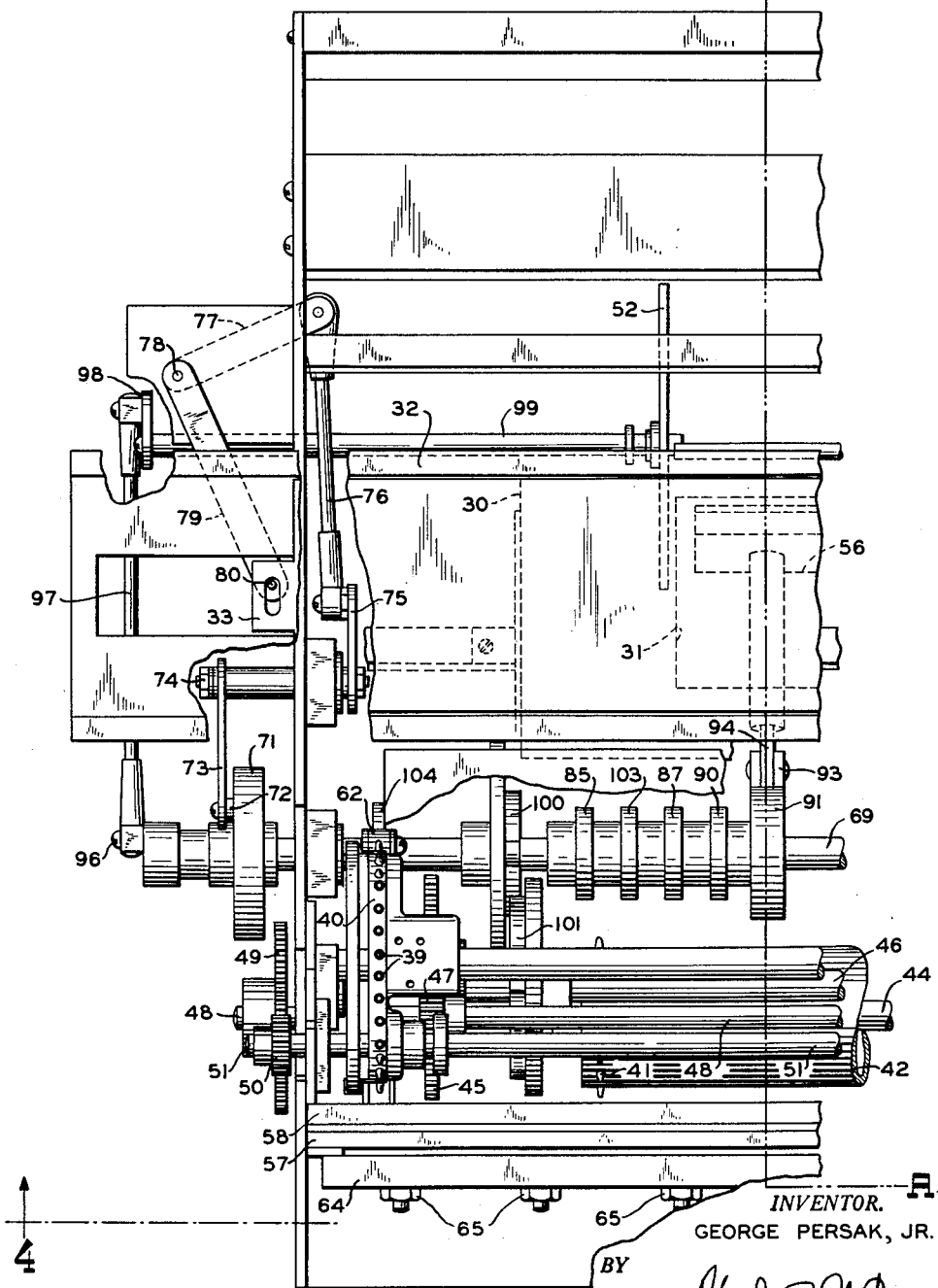

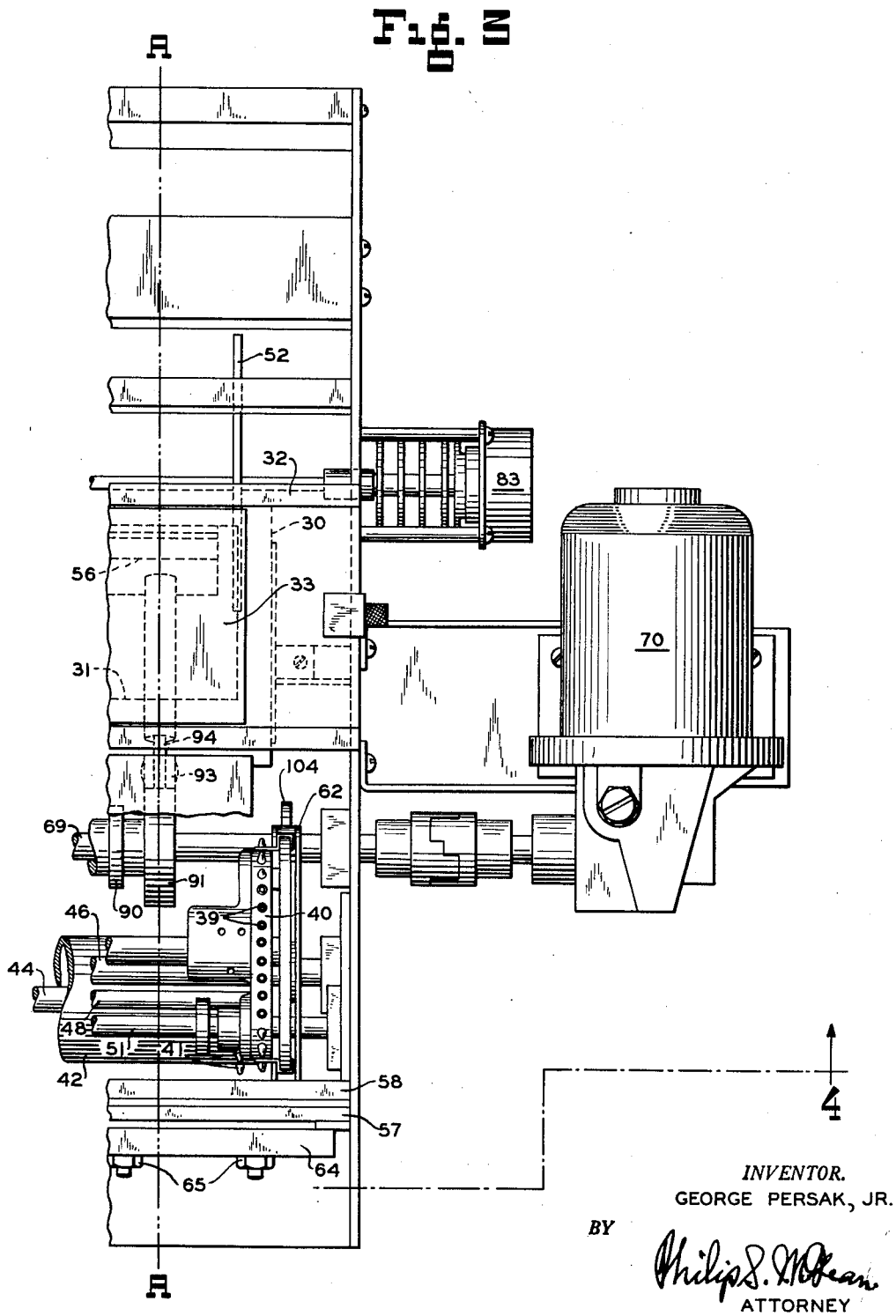

Dec. 8, 1959  G. PERSAK, JR  2,915,965
MACHINE FOR PRINTING AND VENDING INSURANCE FORMS
Filed Feb. 7, 1955  9 Sheets-Sheet 4
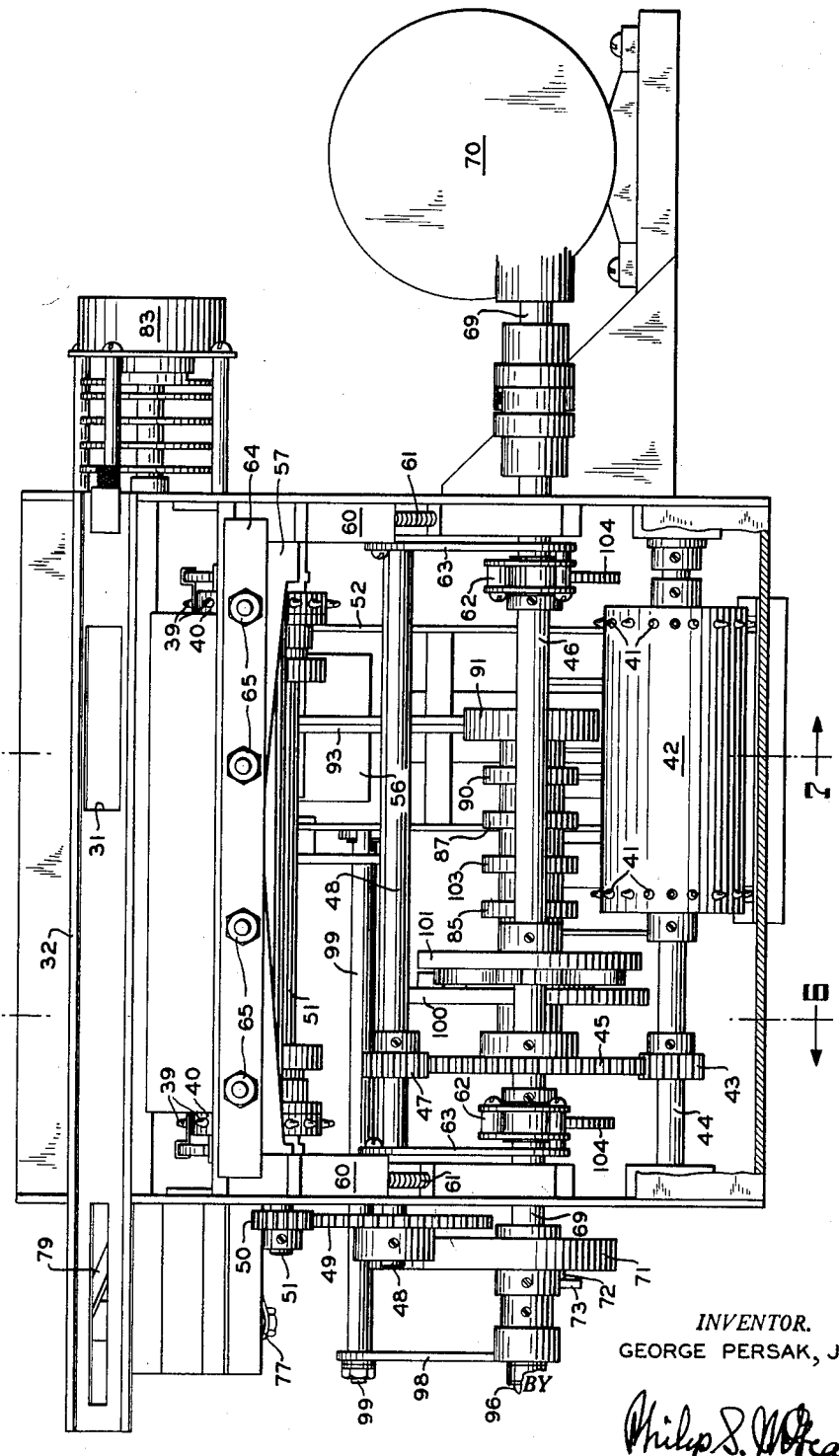
INVENTOR.
GEORGE PERSAK, JR.
ATTORNEY

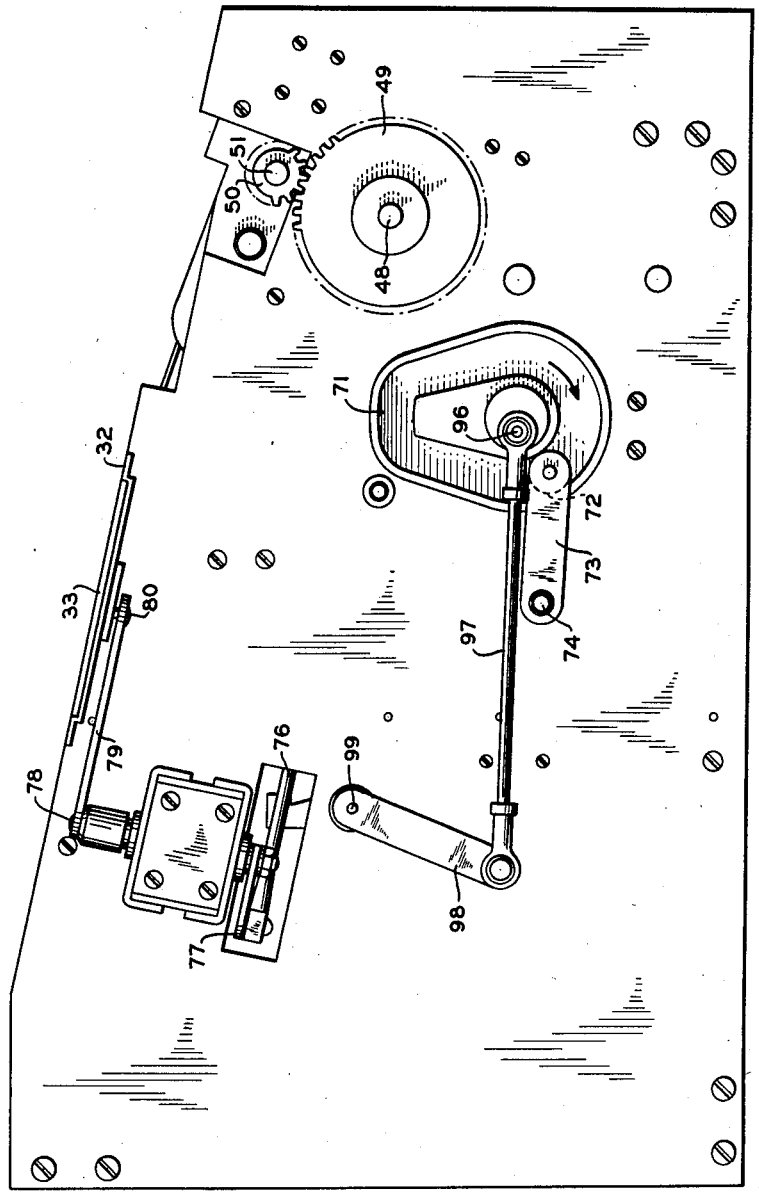

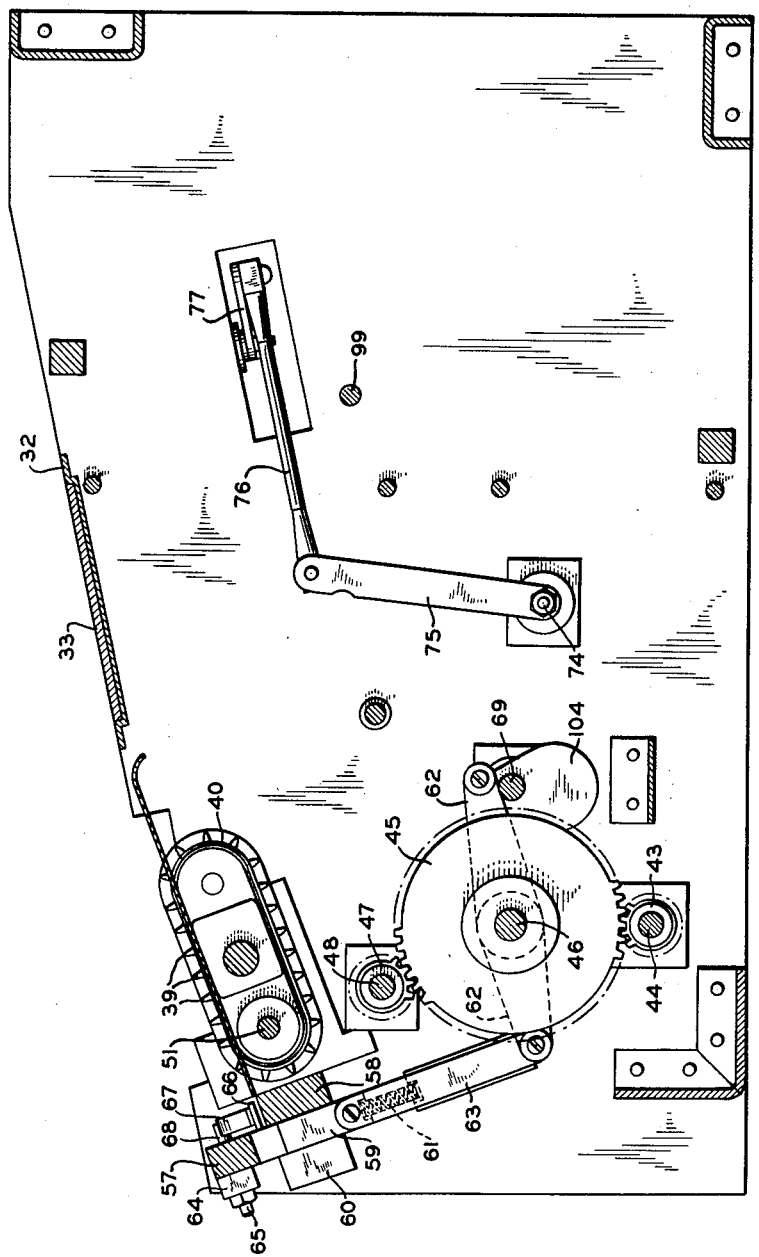

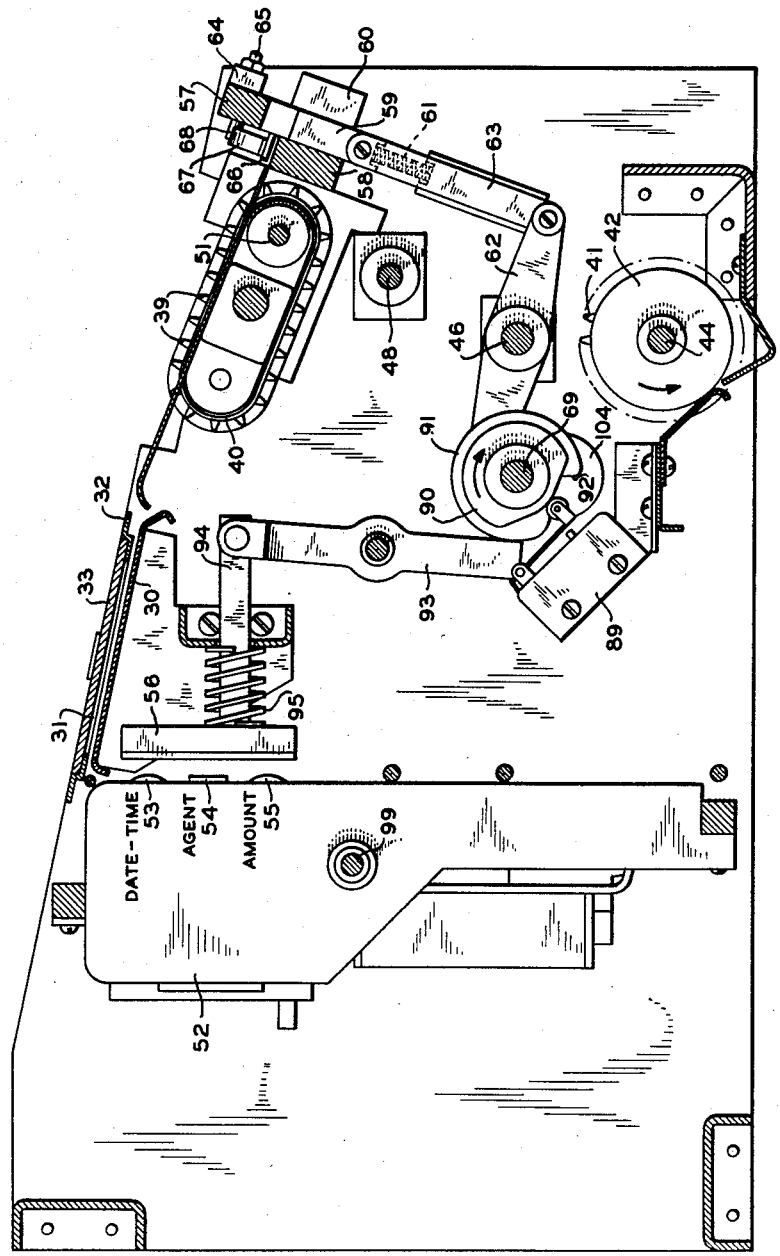

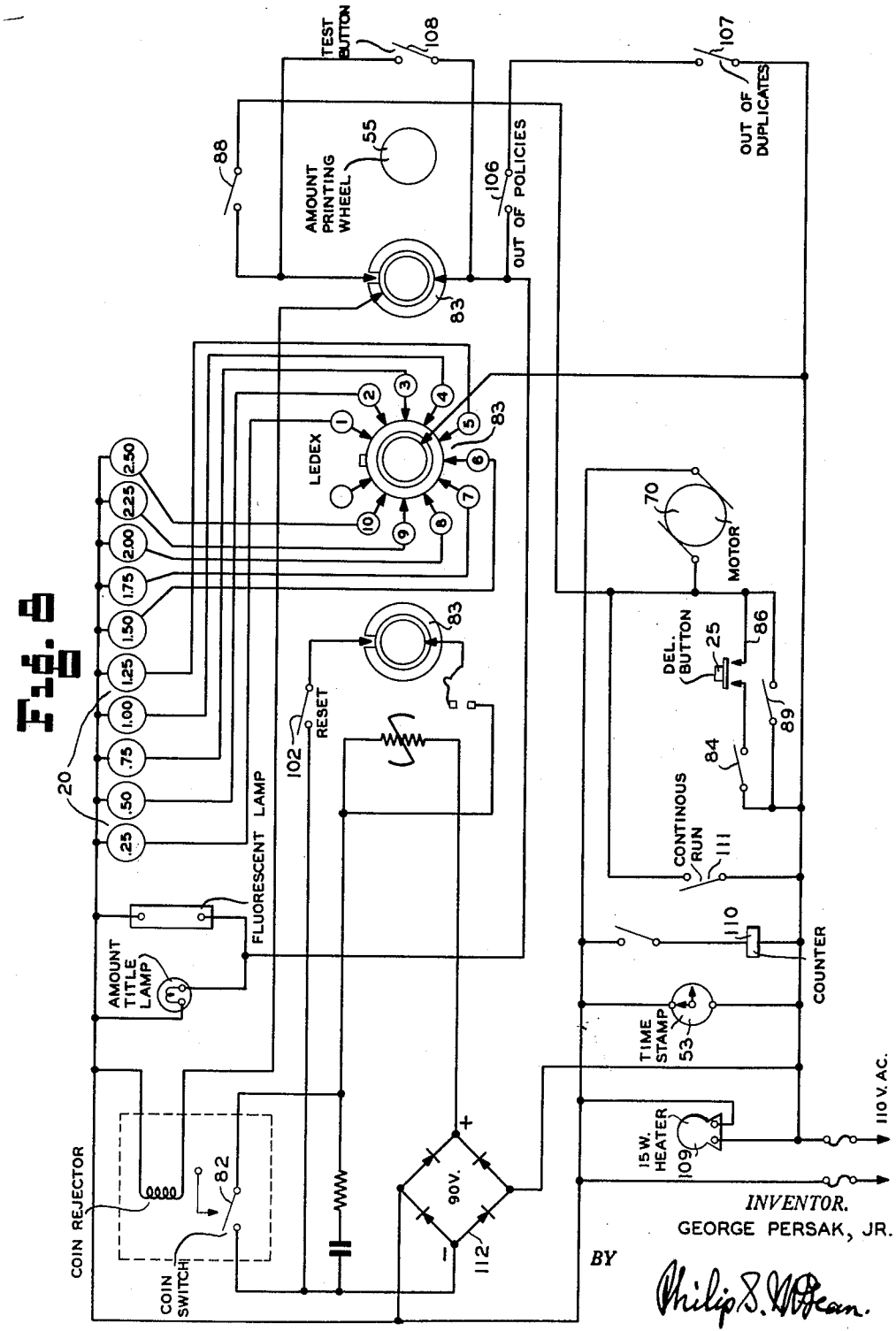

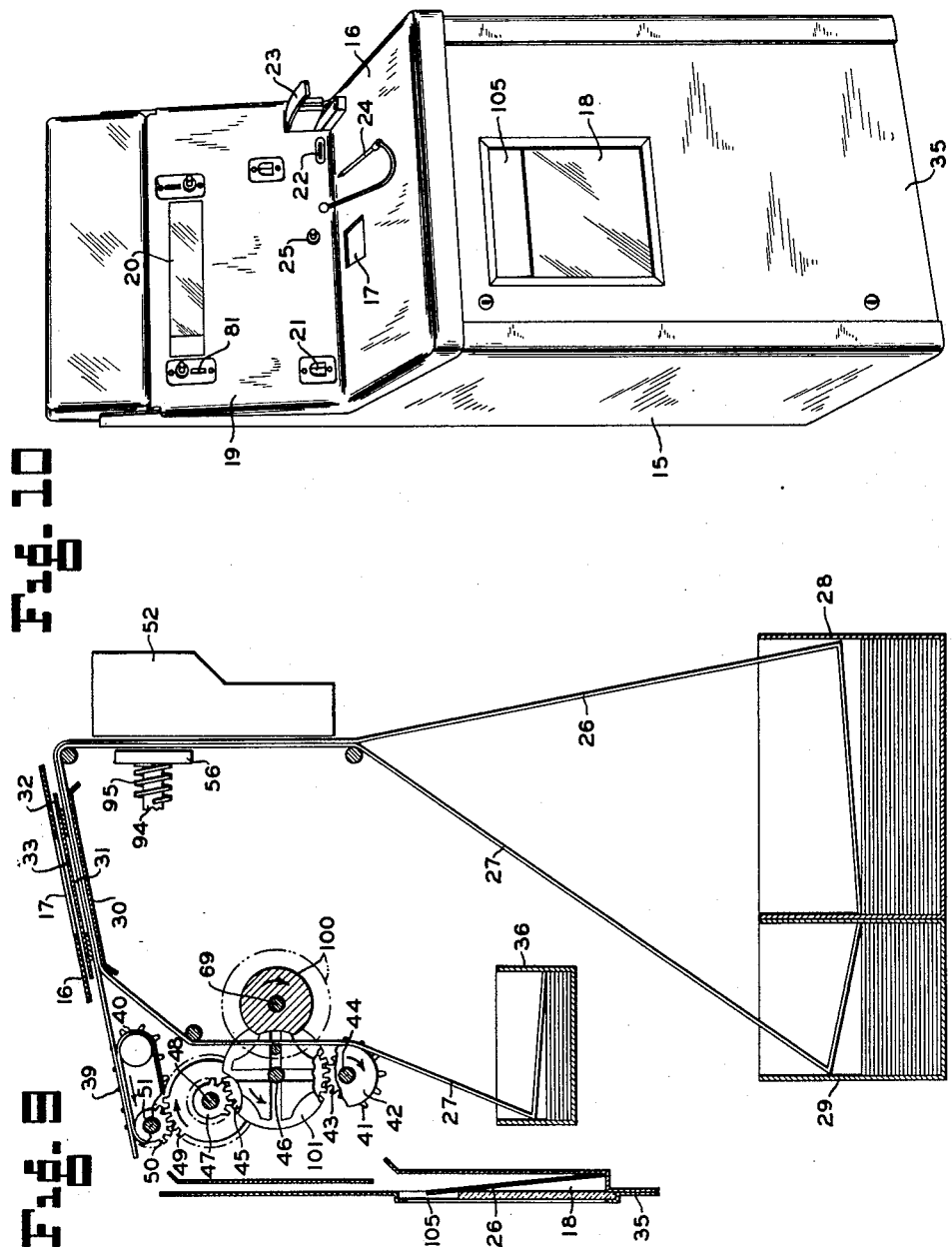

United States Patent Office 2,915,965
Patented Dec. 8, 1959

2,915,965

MACHINE FOR PRINTING AND VENDING INSURANCE FORMS

George Persak, Jr., Verona, N.J., assignor to The Oiljak Manufacturing Co., Inc., Montclair, N.J., a corporation of New Jersey Application February 7, 1955, Serial No. 486,424

7 Claims. (Cl. 101—90)

The invention herein disclosed while not so restricted, has been designed particularly and for purposes of disclosure is here so illustrated and described, as a machine for vending short-term, single trip insurance policies.

Accordingly, the invention may be considered as including means for accepting, indicating and accounting for a requisite coin or coins and actuated thereby to initiate operation of a motor, first to expose a portion of a policy which is to be inscribed with purchaser's name and other details and to condition a motor operation circuit; a control switch is the so conditioned circuit operable after the policy has been properly filled out, to effect further operation of the motor sufficient to cover the written policy, stamp the time, date and amount on the original policy, with copy on a smaller duplicate, index the ribbon of the recorder ready for the next printing operation, operate tractor and drum feeds to advance the original and discharge the copy into storage and then to cut off and drop the completed policy into a holder accessible to the operator.

The objects of the invention have been to provide a machine of this character which would attract the interest of casual observers and be readily understood and operated and which would be accurate, reliable and dependable in its operation, simply and safely constructed and strong and rugged to stand the treatment to be expected in such more or less public places where it would be displayed.

Other special objects of the invention have been to provide a machine such as outlined which may be easily kept supplied with necessary stock forms for the originals and copies, which would not require much or anything in the way of servicing but which could, as occasion might require, be readily serviced or repaired and which could be readily tested by those authorized without requiring the use of coins and would then automatically indicate right on the policies and copies the fact of such tests.

Further special objects of the invention have been to assure full protection of the purchaser particularly in returning additional coins other than those intended to be taken by the machine, and to return coins if power is off or if the machine runs out of the insurance forms.

Other desirable objects attained by the invention and the novel features of construction, combination and relation of parts by which such objects are attained are set forth and will appear in the course of the following specification.

The drawings accompanying and forming part of the specification illustrate a practical commercial embodiment of the invention. Structure, however, may be modified and changed as regards the immediate illustration, all within the true intent and scope of the invention as hereinafter defined and claimed.

Fig. 1 in the drawings is a broken perspective and somewhat diagrammatic view illustrating in a general way important features of the invention;

Figs. 2 and 3 are companion broken top plan views, Fig. 2 showing the left-hand and Fig. 3 the right-hand side portions of the machine;

Fig. 4 is a broken front elevation partly in section on substantially the plane of line 4—4 of Figs. 2 and 3;

Fig. 5 is an elevation of the left-hand side of the machine;

Figure 1:
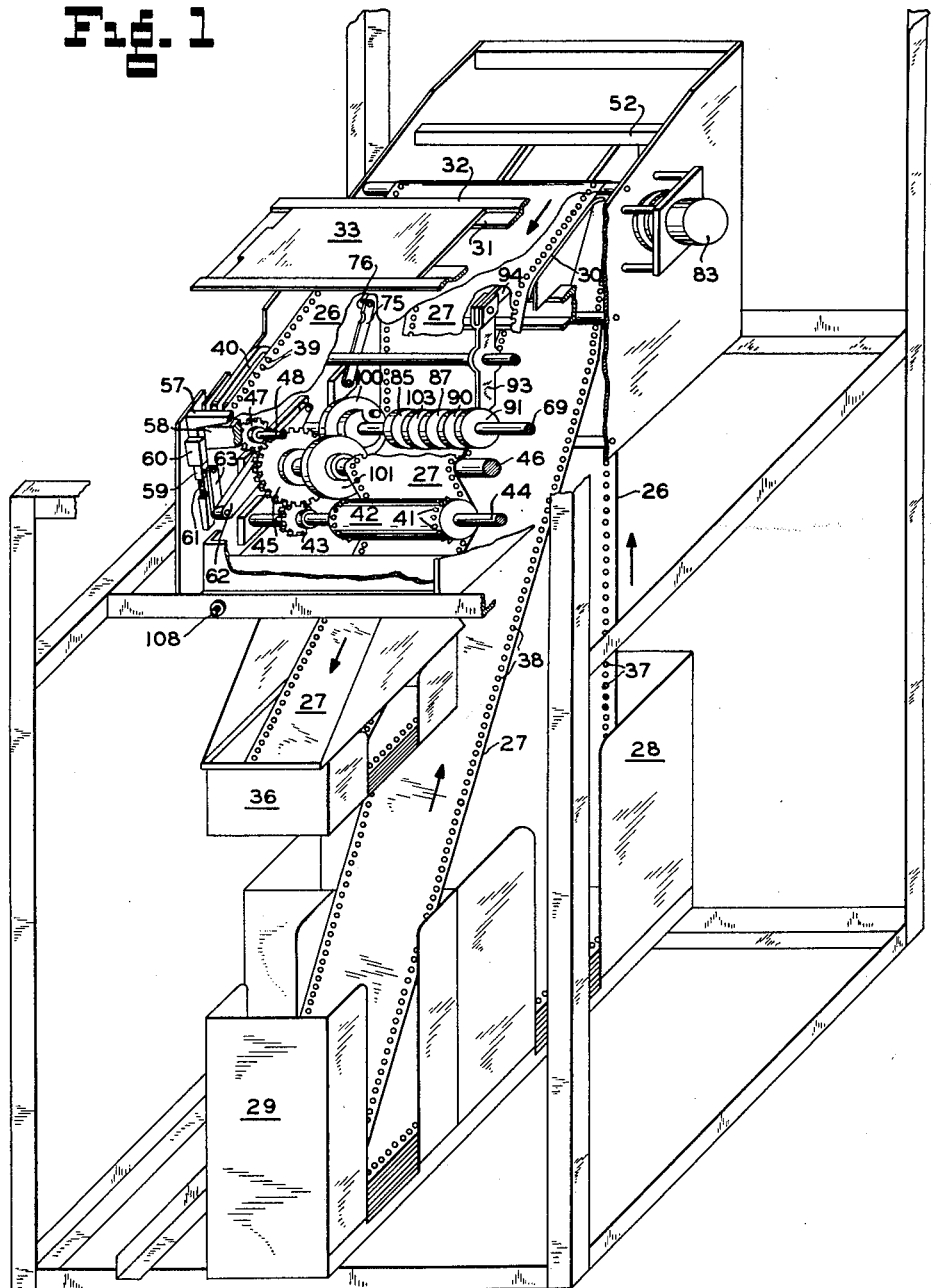

Figs. 6 and 7 are broken longitudinal sectional views on substantially the planes of lines 6—6 and 7—7, respectively, of Fig. 4;

Fig. 8 is a wiring diagram;

Fig. 9 is a partly sectional diagrammatic view illustrating the paper feed;

Fig. 10 is a front, outside view of the machine.

General appearance of the machine is indicated in Fig. 10. There is shown a cabinet structure 15 having an inclined top or table surface 16 with an opening 17 for exposing the portion of the policy to be written on, and having at the front a transparent pocket 18 into which the finished policy is dropped.

The upright panel portion 19 at the back of the cabinet may carry instructions or advice for use of the machine, lights at 20 for showing value of policy being processed, coin return pocket 21, stamp vendor 22, stapler 23 for fastening a folded policy for mailing, attached writing implement 24 for filling out the blank form and switch button 25 for effecting delivery of the finished policy.

Figs. 1 and 9 show the record forms as a full-size policy strip 26 and a half-size duplicate or copy strip 27 extending from supply holders 28, 29 in superposed relation over the inclined writing table 30 beneath the opening 31 in top plate 32 normally closed by slide shutter 33, the original feeding forwardly to drop when severed, into receptacle pocket 18 in the front door 35, and the smaller duplicate leaving the original and folding down into the receiver 36.

Making the duplicate half-size or smaller than the original saves paper cost and reduces storage space in the machine.

The original may be "spotted" with carbon on the back to transmit printed and written impressions to the copy strip.

Both strips are shown as perforated along opposite edges at 37, 38, the uppermost, wider strip to track the pins 39 of tractor feed chains 40, and the lower, narrower strip to engage the pins 41 of a feed roller 42.

The duplicate blanks being half the length of the original forms, are fed at each operation half the length of the originals.

This is accomplished in the illustration by a pinion 43 on the shaft 44 of the feed drum in mesh with gear 45 on a shaft 46 which drives at the opposite side. Fig. 6, a smaller pinion 47 on shaft 48 carrying a larger gear 49, Fig. 5, in mesh with a pinion 50 on the tractor shaft 51. Through this speed-up form of gearing the tractor chains are driven at twice the speed and twice the distance of the drum from the same common drive shaft 46.

Just before reaching the writing table the record strips pass over the face of a time stamp, shown at 52 in Fig. 7 as having time and date wheels 53, agent's name type 54 and amount wheels 55, opposed to a spring pressed hammer platen 56.

Delivery of the completed policy is accomplished in the illustration by a guillotine form cutter shown in Figs. 4, 6 and 7 as a knife blade 57 having a cutting edge inclined upwardly from opposite ends toward the center to shear the paper against the edge of the stationary blade 58, the movable blade carried by plungers 59 sliding in guides 60 pressed upwardly by springs 61 and drawn downwardly by levers 62 connected to the plungers by pivoted links 63.

The movable blade 57 is shown as mounted on a supporting bar 64 and as adjustable on that bar toward and away from the stationary blade by screws 65.

To prevent the relatively wide strip of paper from rippling or wrinkling and assure positive, clean cut, the paper is held down in the illustration, by a presser bar 66 directly overlying the stationary cutter bar 58, Figs. 6 and 7, carried by springs 67 slidingly engaged in slotted pins 68 projecting from the face of the movable cutter bar. This overlying pressure applying strip or bar engages the paper before the knife and the springs 67 permit it to remain in yielding holding engagement with the paper while the knife finishes the cut. Cutting from the edges toward the center, the doubly inclined knife centers the strip and drops it straight without slanting toward one side or the other.

Sequence and timing of operations described is positively and accurately effected in the illustration from a single main drive shaft 69 operated directly from a reduction gear motor 70.

This drive shaft is controlled to make one complete revolution and stop for each cycle of operations, carrying the cam elements necessary for effecting such operations in proper sequence.

In Figs. 2, 4 and 5 there is shown an internal cam 71 on the left end portion of the shaft engaged by cam roller 72 on the end of lever 73 carried by rock shaft 74. At the opposite end rock shaft 74 carries an upstanding arm 75 connected by pivoted link 76 with an arm 77 on the lower end of upright shaft 78, and this shaft carries at the upper end a lever 79 having a pin and slot connection 80 with the outer end of the shutter 33. The parts are proportioned so that with rotation of main shaft 69 the shutter will be shifted outwardly sufficiently to fully open the writing opening 31.

The machine illustrated is intended to start upon the insertion of a proper coin, such as a quarter, in the coin slot indicated at 81, Fig. 10. This has the effect of closing switch 82 shown in the wiring diagram, Fig. 8, to energize motor 70 which then operates to turn the main shaft approximately 85°, sufficient to fully open the writing opening.

With deposit of the first coin the coin switch 82 is closed and, in this case also a rotary solenoid switch, in some instances identified at a "Ledex" switch 83, is actuated to energize the proper amount indicating light 20 at the head of the cabinet.

Upon approximately 50° rotation of the main shaft a microswitch 84 is actuated by a cam 85 on the shaft to condition that portion 86 of the motor controlling circuit which includes the delivery button 25.

Upon completion of approximately 90° of turn a cam 87 on the main shaft actuates microswitch 88 to stop the motor and leave the shutter open for the writing of the policy.

Then, if desired, additional quarters may be inserted up to the limit of the machine, the Ledex switch stepping up the indicator lights for each additional quarter to show the final amount of insurance to be issued.

If counterfeit or more coins are inserted than intended to be taken in, those will simply be returned at the coin return pocket 21.

The machine being stopped with the shutter in open position exposing portions of the policy to be filled out, the necessary entries can be made and the delivery switch 25 actuated to again start the motor. In this second motor operation the delivery circuit is held closed by switch 89 actuated by cam 90 and the shutter is closed by cam 71 at approximately 95° of rotation.

In further movement of the main shaft 69, at approximately 115°, a cam 91 having a drop 92 releases one end of lever 93, Fig. 7, which is connected at the opposite end with plunger 94 carrying the platen 56. On such release spring 95 is effective to snap the platen against the printing elements of the time stamp 52.

After printing of the original and copy, further rotation of the main shaft in the illustration will effect indexing of the ribbon of the time stamp through the medium of a crank pin 96 on the end of the shaft connected by rod 97, Fig. 5, with a lever 98 on the end of rock shaft 99, the latter connected with the ribbon indexing mechanism as by pawl and ratchet usually present in the time stamp.

In rotation from approximately 125° to 215°, the shaft 46 is turned to actuate the tractor and the drum feeds for the original and duplicate policies by a Geneva gear couple consisting of a driver or actuator 100 on main shaft 69 and a companion follower 101 on shaft 46, Figs. 2 and 4.

The Geneva gear cam operation from the main shaft is thus effective to advance the original to a delivery position beneath the cut-off knife and to feed the duplicate back into storage at 29.

In rotation of the main shaft through approximately 180° the Ledex switch is returned to zero position by operation of microswitch 102 from cam 103.

In continuing operation of the main shaft through approximately 220° to 300°, cams 104, Figs. 4 and 6 rock the levers 62 which are connected with plungers 59 to lower knife 57 and cut off the original policy, which latter then drops into pocket 18 on the back of the cabinet door. As shown in Fig. 9, the door has an opening 105 at the top of this pocket through which the policy may be withdrawn.

In the final phase of its travel to 360° cam 90 on the main shaft opens the holding switch 89 to stop the motor.

The wiring diagram shows a feeler switch 106 connected and arranged to return a deposited coin if the machine is out of originals, and a feeler switch 107 also connected and arranged to return coins if the machine is out of duplicate forms.

As a convenience for servicing and testing, the machine illustrated is shown as equipped with a test switch 108, Figs. 1 and 8, which can be actuated by an authorized person, as by a serviceman having a key to the cabinet, to start the motor for going through the complete cycle without the need of using coins to start the machine.

The wiring diagram shows in a general way other accessory features which may be incorporated in the machine, such as a heater 109, ordinarily a small electric lamp in the base of the machine for keeping the paper dry and conditioned for proper handling, a counter 110 actuated to record the number or other data of policies issued, a continuous run switch 111, rectifier 112 furnishing current from the A.C. source to the D.C. rotary solenoid 83, and other details.

The machine is attractive in appearance, such as to attract the interest of casual observers, and is so simple in operation as to be instantly understood and be quickly operated even by one in a hurry to catch a train or other means of transportation.

All that the purchaser is required to do is to deposit a coin or coins, depending on value of policy desired, fill out blanks in the policy and then press the delivery button.

The deposit of coin or coins initiates the first stage in which the shutter is opened to expose the original policy and the circuit is armed to render the delivery button effective.

After filling out the policy the delivery button is pushed and this accomplishes the holding of the delivery circuit closed, effects the closing of the shutter, operates the time, day and amount stamp, indexes the ribbon, operates the tractor and sprocket drum to advance the original and store the duplicate records, return the amount indicating switch to zero, cut off and deliver the original policy and stop the motor.

The present machine is shown equipped with a stapler 23, Fig. 10, by which the policy, after folding, may be secured for mailing and with a stamp vender 22, thus to enable the insured to immediately mail the effective policy to the beneficiary.

The test switch 108 may be connected in on the time stamp, as indicated in the wiring diagram, so that when operated it will cause the time stamp to imprint a "T" or other chosen code mark in place of the value mark, thus to preserve a true record of machine actuation.

The one revolution and one main shaft carrying cams for effecting all the several operations constitute a particularly simple, practical construction, compact and small in size, which can be produced at reasonably low cost and which operates quietly and smoothly to quickly accomplish desired results.

While primarily designed for insurance vending purposes, it will be apparent that the invention or features of the invention may be applied to other and different uses, and the claims are intended to be so construed.

What is claimed is:

1. Vending machine of the character disclosed, comprising the combination of means for supporting original and duplicate forms superposed in writing position, a cover over said writing position, means for shifting said cover to expose portions of the original form to be written on, means for feeding the original form past the writing position and for feeding the duplicate form to storage in the machine, said machine having a delivery outlet in the line of feed of the original forms, a knife for cutting off an original form advanced by the feeding means to said delivery outlet, drive mechanism for effecting sequential operation of the several means described including a motor and means for initiating operation of said motor and for automatically stopping operation of the motor on completion of the operations described, said original and duplicate forms being in strips perforated along their edges with the duplicate forms of smaller size than the original forms, said feeding means for the original forms being toothed tractor chains driven at one speed and the feeding means for the duplicate forms comprising a toothed feed drum operated at lesser feeding speed than said tractor chains and said drive mechanism including a single drive shaft, a Geneva gear coupled for intermittently actuating said single drive shaft and gearing from said single drive shaft for operating said tractor chains at one speed and said feed drum at lesser speed.

2. Vending machine of the character disclosed, comprising the combination of means for supporting original and duplicate forms superposed in writing position, a cover over said writing position, means for shifting said cover to expose portions of the original form to be written on, means for feeding the original form past the writing position and for feeding the duplicate form to storage in the machine, said machine having a delivery outlet in the line of feed of the original forms, a knife positioned for cutting off an original form advanced by the feeding means to said delivery outlet, drive mechanism for effecting sequential operation of the several means described and knife including a one revolution shaft, cams on said shaft for effecting operation of said means and said knife in one revolution of the shaft, a motor arranged to operate said shaft and means for initiating operation of said motor and for automatically stopping operation of the motor on completion of a single revolution of said cam bearing shaft and completion of the operations described, means for effecting testing operation of said motor independently of said prior mentioned means for initiating operation of the motor and a printing device actuated by said testing mechanism for applying a test operation indication on said original and duplicate forms.

3. Vending machine of the character disclosed comprising the combination of means for supporting original and duplicate forms superposed in writing position, a cover over said writing position, means for shifting said cover to expose portions of the original form to be written on, means for feeding the original form past the writing position and for feeding the duplicate form to storage in the machine, said machine having a delivery outlet in the line of feed of the original forms, a knife for cutting off an original form advanced by the feeding means to said delivery outlet, drive mechanism for effecting sequential operation of the several means described including a motor and means for initiating operation of said motor and for automatically stopping operation of the motor on completion of the operations described, a time stamp, means actuated by said drive mechanism for effecting printing operation of said time stamp on the original and duplicate forms and means for effecting testing operation of the machine including means at said time stamp for printing test operation indication on the original and duplicate forms.

4. Vending machine of the character disclosed, comprising the combination of means for supporting original and duplicate forms superposed in writing position, a cover over said writing position, means for shifting said cover to exposee portions of the original form to be written on, means for feeding the original form past the writing position and for feeding the duplicate form to storage in the machine, said machine having a delivery outlet in the line of feed of the original forms, a knife positioned for cutting off an original form advanced by the feeding means to said delivery outlet, drive mechanism for effecting sequential operation of the several means described and knife including a one revolution shaft, cams on said shaft for effecting operation of said means and said knife in one revolution of the shaft, a motor arranged to operate said shaft and means for initiating operation of said motor and for automatically stopping operation of the motor on completion of a single revolution of said cam bearing shaft and completion of the operations described, test mechanism connected to effect test driving operation of said motor independently of said means for initiating operation of the motor, a time stamp, means actuated by said drive mechanism for effecting printing operation of said time stamp on the original and duplicate forms and means at said time stamp controlled by said test mechanism for printing test operation indication on the original and duplicate forms.

5. Machine for vending insurance policies or the like, comprising a table for supporting larger original and smaller size duplicate perforated forms superposed in writing position, toothed tractor chains at the end of said table and engageable with the perforations in the original forms, a toothed feed drum below the tractor chains engageable with the perforations in the smaller size duplicate forms, a motor driven main drive shaft, cam mechanism on said drive shaft and gearing extending therefrom for driving said tractor chains at one speed and said feed drum at lesser speed, means for automatically stopping said motor shaft upon completion of one rotation, said cam mechanism and the gearing extending therefrom being proportioned to effect the advance of one complete original policy form and one smaller duplicate form in one revolution of the shaft, a knife disposed in the line of travel of the original form and cam means on said shaft and connected to effect actuation of said knife upon completion of the single revolution of said drive shaft, said cam mechanism and gearing extending therefrom including a secondary shaft, Geneva gear drive from said drive shaft to said secondary shaft, a single speed gear drive from said secondary shaft to said feed drum and a double speed gear drive from said secondary shaft to said tractor chains.

6. Machine for vending insurance policies or the like, comprising a table for supporting larger original and smaller size duplicate perforated forms superposed in writing position, toothed tractor chains at the end of said table and engageable with the perforations in the original forms, a toothed feed drum below the tractor chains engageable with the perforations in the smaller size duplicate forms, a motor driven main drive shaft, cam mechanism on said drive shaft and gearing therefrom for driving said tractor chains at one speed and said feed drum at lesser speed, means for automatically stopping said motor shaft upon completion of one rotation, said cam mechanism and the gearing extending therefrom being proportioned to effect the advance of one complete original policy form and one smaller duplicate form in one revolution of the shaft, a knife disposed in the line of travel of the original form and cam means on said shaft and connected to effect actuation of said knife upon completion of the single revolution of said drive shaft, a movable shutter for covering and uncovering the original forms at the writing position, cam mechanism on the drive shaft for imparting opening and closing movements to said shutter in the single revolution movement of said drive shaft, a time stamp positioned to print on the original and duplicate forms and cam mechanism for actuating said time stamp following the closing movement of said shutter.

7. Vending machine of the character disclosed, comprising the combination of means for supporting original and duplicate forms superposed in writing position, a cover over said writing position, means for shifting said cover to expose portions of the original form to be written on, means for feeding the original form past the writing position and for feeding the duplicate form to storage in the machine, said machine having a delivery outlet in the line of feed of the original forms, a knife positioned for cutting off an original form advanced by the feeding means to said delivery outlet, drive mechanism for effecting sequential operation of the several means described and knife including a one revolution shaft, cams on said shaft for effecting operation of said means and said knife in one revolution of the shaft, a motor arranged to operate said shaft and means for initiating operation of said motor and for automatically stopping operation of the motor on completion of a single revolution of said cam bearing shaft and completion of the operations described, said drive mechanism includes a secondary shaft for effecting the feeding of said original and duplicate forms and a Geneva gear drive connection from said one revolution cam carrying shaft to said secondary shaft.

References Cited in the file of this patent

UNITED STATES PATENTS

| | | |
|---|---|---|
| 1,230,319 | Paulson | June 19, 1917 |
| 1,575,648 | Seybold | Mar. 9, 1926 |
| 1,804,200 | Brouse | May 5, 1931 |
| 2,035,095 | Racz | Mar. 24, 1936 |
| 2,216,081 | Kniehan | Sept. 24, 1940 |
| 2,266,825 | Streckfuss | Dec. 23, 1941 |
| 2,271,073 | Harris | Jan. 27, 1942 |
| 2,318,020 | Sherman | May 4, 1943 |
| 2,331,635 | Streckfuss | Oct. 12, 1943 |
| 2,392,838 | Davidson | Jan. 15, 1946 |
| 2,575,606 | Wales | Nov. 20, 1951 |
| 2,596,230 | Frick | May 13, 1952 |
| 2,612,976 | Harper | Oct. 7, 1952 |